United States Patent [19]

Iwaki

[11] Patent Number: 4,615,626
[45] Date of Patent: Oct. 7, 1986

[54] ROLLING BEARING DEVICE

[75] Inventor: Yoshiyuki Iwaki, Himeji, Japan

[73] Assignee: Mitsubishi Denki Kabushiki Kaisha, Tokyo, Japan

[21] Appl. No.: 584,795

[22] Filed: Feb. 29, 1984

[30] Foreign Application Priority Data

Apr. 18, 1983 [JP] Japan .............................. 58-58221[U]

[51] Int. Cl.[4] ...................... F16C 43/04; F16C 35/077
[52] U.S. Cl. ........................................ 384/539; 384/561
[58] Field of Search .......... 308/236, DIG. 11, 189 R; 403/236, 235; 411/517, 518, 519, 353, 352; 384/539, 561, 585, 588, 547

[56] References Cited

U.S. PATENT DOCUMENTS

| 2,886,355 | 5/1959 | Wurzel ............................ 308/236 X |
| 3,669,519 | 6/1972 | Takahashi et al. .................. 308/236 |
| 3,880,483 | 4/1975 | Snyder, Jr. ........................ 308/236 |
| 4,364,615 | 12/1982 | Euler ................................. 308/236 |

*Primary Examiner*—Stuart S. Levy
*Assistant Examiner*—Thomas R. Hannon
*Attorney, Agent, or Firm*—Oblon, Fisher, Spivak, McClelland & Maier

[57] ABSTRACT

A rolling bearing device comprises a ball bearing having an outer ring and an inner ring to which a rotating shaft is fitted, a snap ring fitted in an eccentric annular groove formed in the outer circumferential surface of the outer ring of the ball bearing, the snap ring having a head portion projecting in the radial direction from the groove and an inner circumferential part supporting the ball bearing therein. The inner circumferential part is provided with a small diameter part to which the outer ring of the ball bearing is fitted and a large diameter part having a diameter greater than that of the small diameter part but allowing passing of the head portion of the snap ring.

2 Claims, 4 Drawing Figures

ROLLING BEARING DEVICE

The present invention relates to a rolling bearing device for supporting a rotating shaft. More particularly, it relates to a rolling bearing device having an improved bearing box containing a ball bearing.

As a bearing device for supporting a rotating shaft of a machine such as a small-sized generator, there has been one as shown in FIG. 1. In FIG. 1, a bearing box 1 contains a ball bearing 3 comprising an inner ring 4, an outer ring 5 and a plurality of balls 6. A rotating shaft is fitted to the inner ring 4 of the ball bearing 3 and the outer ring 5 is fitted to the inner circumferential part 1a of the bearing box 1.

In the outer circumferential part of the outer ring 5, there is formed an eccentric annular groove 7, as shown in FIG. 2 illustrating an enlarged cross-sectional view of the bearing device, into which a snap ring 8 is inserted. The snap ring 8 is made of a metallic resilient material and is formed into a hair-pin shape (a substantially semi-circular U-shape) having a four-corner in cross section. The snap ring is further formed in such a manner that when it is fitted to the eccentric groove 7, an intermediate head portion 8a projects in the radial direction by a dimension c from the outer circumferential surface of the outer ring 5.

The bearing device is fabricated by securing the rotating shaft 2 to the ball bearing 3 with the snap ring 8 fitted in the eccentric annular groove 7 formed in the outer ring 5 as shown in FIG. 2, followed by fitting the ball bearing 3 into the inner circumferential part 1a of the bearing box 1 along the axial line. Thus, the head portion 8a of the snap ring 8 resiliently contacts to the inner circumferentail part 1a to prevent a creep which takes place by the rotation of the outer ring 5 as the balls 6 roll.

In the conventional device, however, there took place scars 1b caused by scuffing on the surface of the inner circumferential part 1a because the corners of the four-cornered shape in cross section of the head portion 8a of the snap ring 8 are strongly pushed to the surface when the ball bearing 3 is to be fitted into the inner circumferential part 1a of the bearing box 1. This causes the outer ring 5 to be fitted with an inclination angle $\theta$ with respect to the inner ring 4 with the result of decreasing the lifetime of the bearing device. Thus, in the conventional device, the scars 1b caused by scuffing are liable to occur due to the snap ring 8 in the time of insertion of the bearing 3 into the bearing box 1 and the scars 1b become larger as the moved distance of the bearing in the axial direction becomes large, hence inclination angle of the outer ring 5 increases.

It is an object of the invention to provide an improved rolling bearing device useful for a long time period in which a small diameter part and a large diameter part are formed in the inner circumferential part of a bearing box to provide a step and the inner diameter of the large diameter part is so determined as to allow passing of a head portion of a snap ring to prevent inclination of the outer ring of a bearing to be inserted into the inner circumferential part.

It is another object of the present invention to provide a rolling bearing device useful for a long time period and facilitating insertion of the bearing by forming in the inner circumferential part of a bearing box a small diameter part and a large diameter part allowing the passing of a head portion of a snap ring and a slope connecting the small and large diameter parts.

IN THE DRAWING

The foregoing object, other objects as well as the specific construction and function of the rolling bearing detection device according to the present invention will become more apparent and understandable from the following detailed description of a preferred embodiment thereof, when read in conjunction with the accompanying drawing.

Figure 1:
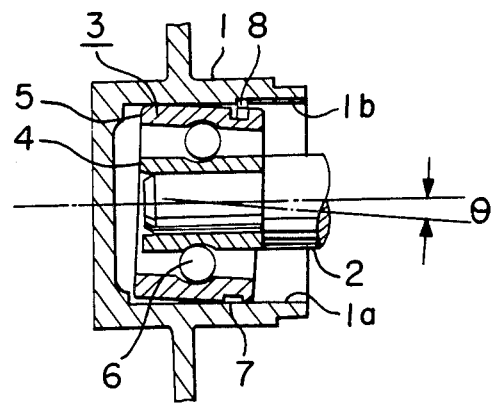
FIG. 1 is a longitudinally sectional view of a conventional bearing device.
Figure 2:
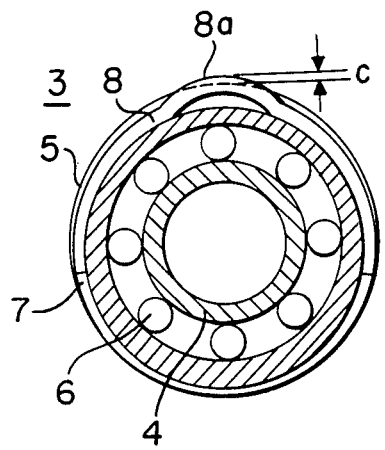
FIG. 2 is a cross sectional view of a ball bearing showing a state before insertion into a bearing box.
Figure 3:
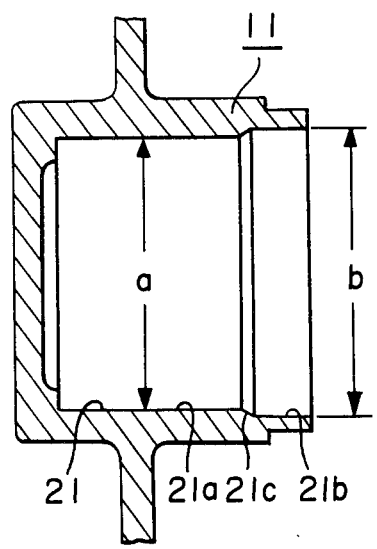
FIG. 3 is a longitudinally sectional view of an embodiment of a bearing box of the present invention.
Figure 4:
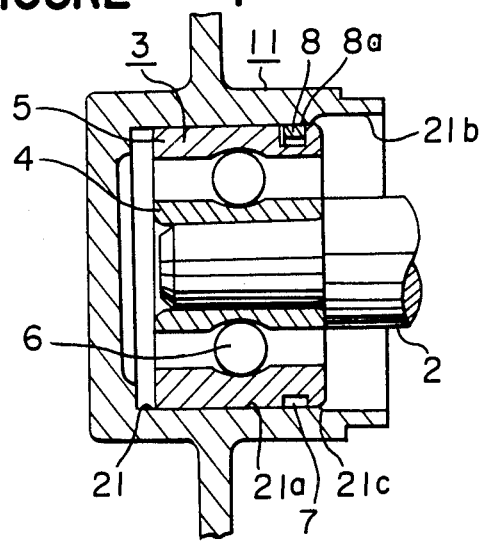
FIG. 4 is a longitudinally sectional view of an embodiment of the bearing device of the present invention.

An embodiment of the rolling bearing device of the present invention will be described with reference to FIGS. 3 and 4. In the Figures, reference numerals 2 to 8 and 8a designate the same part as the conventional device.

A bearing box 11 is provided with an inner circumferential part 21 holding the ball bearing 3 therein. The inner circumferential part 21 is formed of a small diameter part 21a to which the outer ring 5 of the ball bearing 3 is fitted and a large diameter part 21b which has a diameter greater than the small diameter part 21a and allows to pass the head portion 8a of the snap ring without depression.

The inner dimension b of the large diameter part 21b is greater than the outer diameter of the outer ring 5, that is, the inner diameter a of the small diameter part 21a by about two times of a length c of the projection of the head portion 8a from the outer ring 5. Accordingly, relationship of the dimensions a, b and c is given as a $+2c = b$. A shoulder part formed between the small and large diameter parts 21a, 21b is chamfered to provide a slope surface 21c. The inclination angle of the slope is preferably in the range from about 15° to about 60° with respect to the large diameter part 21b. It is necessary to form the large diameter part 21b in the bearing box 11 on the side of insertion of the ball bearing 3 into the bearing box 11.

When the bearing 3 secured to the rotating shaft 2 and attached with the snap ring 8 in the eccentric annular groove 7 of the outer ring 5 is inserted into the bearing box 11 constructed as above-mentioned, the bearing 3 is passed in the large diameter part 21b without causing the head portion 8a to be depressed. In further advance of the bearing 3, since the head portion 8a of the snap ring 8 is gradually depressed at the sloping surface 21c, scuffing in the small diameter part is prevented whereby there occurs no inclination of the outer ring 5 to the extent causing a hindrance for practical use.

In the embodiment, though chamferring is conducted to the shoulder part formed between the small and large diameter parts 21a, 21b in the circumferential part 21 of the bearing box 11, it can be omitted in case that the outer ring can be inserted in the bearing box without inclination.

As described above, in the rolling bearing device of the present invention, the large diameter part is formed in the inner circumferential part of the bearing box in such a manner that the head portion is passed without any hindrance when the outer ring of the ball bearing is inserted in the inner circumferential part with the result that the bearing with the snap ring fitted on the outer ring is smoothly inserted in the large diameter part and is fitted into the small diameter part without causing inclination of the outer ring. Accordingly, the lifetime of the bearing can be prolonged in comparison with the conventional device. Further, the large diameter part serves as a guide for insertion of the bearing and cooperation of the large diameter part with the sloping surface facilitates insertion of the bearing.

I claim:

1. A rolling bearing device comprising:
   (a) a shaft rotatable about an axis;
   (b) an inner ring fitted to said shaft;
   (c) an outer ring circumferentially surrounding said inner ring, said outer ring having a cylindrical outer periphery which has an eccentric annular groove therein;
   (d) a plurality of balls rotatably mounted between said inner ring and said outer ring to permit rotary movement therebetween;
   (e) a snap ring disposed in said eccentric annular groove, said snap ring having a substantially semi-circular U-shape and a 4-cornered shape in cross-section; and
   (f) a bearing box circumferentially surrounding said outer ring, said bearing box having a stepped cylindrical bore which receives said outer ring, said stepped cylindrical bore comprising:
      (i) a small diameter cylindrical part which has a smooth inner surface which snugly engages the outer surface of said outer ring and which bears against said snap ring and forces it resiliently inwardly when said rolling bearing device is assembled;
      (ii) a large diameter cylindrical part sized to permit entry of a subassembly comprising said shaft, said inner ring, said outer ring, said plurality of balls, and said snap ring into said bearing box during assembly of said rolling bearing device without contact between said snap ring and the inner periphery of said large diameter cylindrical part, the diameter of said large diameter cylindrical part of said stepped cylindrical bore being greater than the diameter of said small diameter cylindrical part of said stepped cylindrical bore by an amount which is at least approximately twice the amount by which said snap ring projects radially from said outer ring when in its uncompressed state; and
      (iii) a sloping portion connecting said large and small diameter cylindrical parts of said stepped cylindrical bore, said sloping portion of said stepped cylindrical bore in said bearing box having an at least approximately constant sloping angle of between 15° and 60°,
   whereby said snap ring does not form scars on the inner surface of said large diameter cylindrical part of said bearing box during assembly of said rolling bearing device.

2. A rolling bearing device as recited in claim 1 wherein said snap ring is made of a metallic material.

* * * * *